(12) United States Patent
Chovel et al.

(10) Patent No.: US 11,488,581 B1
(45) Date of Patent: Nov. 1, 2022

(54) SYSTEM AND METHOD OF PROVIDING RECOVERY FOR AUTOMATIC SPEECH RECOGNITION ERRORS FOR NAMED ENTITIES

(71) Applicant: Amazon Technologies, Inc., Seattle, WA (US)

(72) Inventors: Shlomi Chovel, Reut (IL); Adriano Devillaine, Bellevue, WA (US); Omer Shabtai Jakobinsky, Seattle, WA (US); Colin Zhen De Kho, Seattle, WA (US); Kawshik Karur Rangaraju, Seattle, WA (US); Ajay Soni, Kirkland, WA (US); Yochai Zvik, Modiin (IL); Yunqiang Zhu, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 16/706,628

(22) Filed: Dec. 6, 2019

(51) Int. Cl.
*G10L 15/06* (2013.01)
*G10L 15/187* (2013.01)
*G10L 15/22* (2006.01)

(52) U.S. Cl.
CPC .......... *G10L 15/063* (2013.01); *G10L 15/187* (2013.01); *G10L 15/22* (2013.01); *G10L 2015/0635* (2013.01)

(58) Field of Classification Search
CPC ..... G10L 15/063; G10L 15/187; G10L 15/22; G10L 2015/0635; G10L 13/00; G10L 15/30; G06Q 30/0631
See application file for complete search history.

(56) References Cited

U.S. PATENT DOCUMENTS

| | | | | |
|---|---|---|---|---|
| 9,275,637 | B1* | 3/2016 | Salvador | G10L 15/06 |
| 9,280,535 | B2* | 3/2016 | Varma | G06F 16/243 |
| 9,922,364 | B1* | 3/2018 | Chen | G06Q 30/0635 |
| 10,692,489 | B1* | 6/2020 | Grizzel | G10L 15/18 |
| 10,867,602 | B2* | 12/2020 | Yuan | G10L 15/04 |
| 2010/0293195 | A1* | 11/2010 | Houghton | G06F 40/295 |
| | | | | 707/765 |
| 2011/0060587 | A1* | 3/2011 | Phillips | G10L 15/30 |
| | | | | 704/235 |
| 2013/0006623 | A1* | 1/2013 | Chelba | G10L 15/063 |
| | | | | 704/E15.045 |
| 2015/0154953 | A1* | 6/2015 | Bapat | G10L 15/06 |
| | | | | 704/251 |

(Continued)

*Primary Examiner* — Michael Colucci
(74) *Attorney, Agent, or Firm* — Knobbe, Martens, Olson & Bear, LLP

(57) ABSTRACT

A new approach to automatic speech recognition is disclosed. An example method include receiving a first text representing speech recognition of a phrase spoken by a user, isolating a candidate named entity from within the phrase, receiving a first phonetic representation of the candidate named entity, comparing the first phonetic representation to phonetic representations in a mapping database which map the phonetic representations to words to yield a comparison, based on the comparison, identifying a second phonetic representation in the mapping database that matches a second text in the mapping database to the second phonetic representation and replacing the candidate named entity with the second text. The approach can be used for new brands for which automatic speech recognition error rates are high.

17 Claims, 4 Drawing Sheets

(56) References Cited

U.S. PATENT DOCUMENTS

| | | | |
|---|---|---|---|
| 2017/0178624 A1* | 6/2017 | Friedland | G10L 13/00 |
| 2018/0144742 A1* | 5/2018 | Ye | G10L 17/04 |
| 2018/0158449 A1* | 6/2018 | Tang | G10L 15/187 |
| 2019/0043481 A1* | 2/2019 | Georges | G10L 15/02 |
| 2019/0221205 A1* | 7/2019 | Czyryba | G06N 3/0454 |
| 2019/0287526 A1* | 9/2019 | Ren | G10L 15/22 |
| 2020/0082808 A1* | 3/2020 | Li | G10L 15/08 |
| 2020/0134444 A1* | 4/2020 | Chen | G06N 3/084 |
| 2021/0035191 A1* | 2/2021 | Soundararajan | G06Q 30/0631 |
| 2021/0118439 A1* | 4/2021 | Schillmoeller | G06F 3/167 |

\* cited by examiner

SYSTEM AND METHOD OF PROVIDING RECOVERY FOR AUTOMATIC SPEECH RECOGNITION ERRORS FOR NAMED ENTITIES

BACKGROUND

This disclosure relates to machine learning algorithms and systems. Devices have been developed for home or other use to enable interaction with the user via a spoken dialogue. These devices connect to a speech processing component which enables users to speak to these devices in order to perform tasks such as making a phone call, asking for music to be played, or initiating a shopping experience. In some scenarios, the speech processing component will analyze a user utterance to determine the intent of the user. The speech processing component can include automatic speech recognition modules and/or natural language understanding modules to recognize the user speech and determine the user intent.

The automatic speech recognition module can be used to convert spoken audio into text. In some cases, the module is trained on dialogues of users speaking with one another. The words that are often used to train the dialogues include standard words used in normal conversations. However, when a brand name is used in dialogues, the brand name is often not descriptive of the item. Stronger brand names are in fact fanciful and have no relation to the related product. If a new product with a new brand name is introduced into a dialogue, the automatic speech recognition module can have difficulties in interpreting the brand name. The text output from the automatic speech recognition module can have a high error rate because the text that is produced does not accurately match the spoken brand name. A speech recognition error on a brand name can cause additional problems in terms of natural language understanding, searching a database for products, and dialogue management. When new brands are introduced, the automatic speech recognition modules need to be retrained, which can take 2 to 3 months.

BRIEF DESCRIPTION OF THE DRAWINGS

Various embodiments in accordance with the present disclosure will be described with reference to the drawings, in which.

Figure 1:
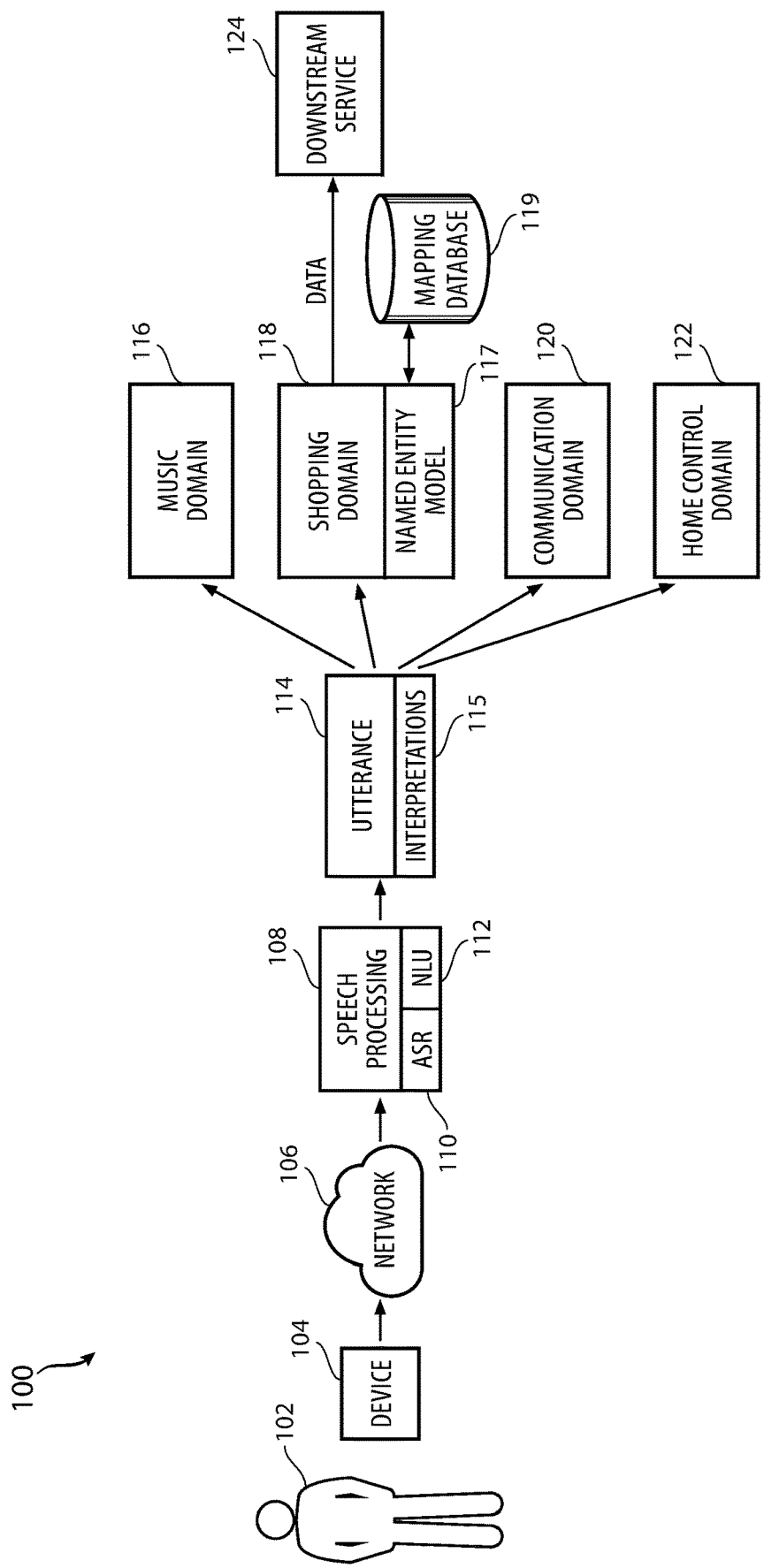
FIG. 1 illustrates an example device and speech processing component communicating with a group of network-based domains.

While the disclosed technology is described herein by way of example for several embodiments and illustrative drawings, those skilled in the art will recognize that the disclosed technology is not limited to the embodiments or drawings described herein. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the words "can" or "may" are used in a permissive sense (i.e., meaning having the potential to), rather than the mandatory sense (i.e., meaning must). Similarly, the words "include", "including", and "includes" mean including, but not limited to. Any feature from any embodiment or example can be utilized with any other feature from another embodiment or example.

DETAILED DESCRIPTION

This disclosure provides a novel approach to improving the customer experience related to spoken dialogue interactions. The disclosed approach addresses the problems of using a named entity in a spoken dialogue that has a higher relative probability of an error in speech recognition. An example of a named entity can be a brand name that is fanciful or made up name and as such will represent an irregular usage of a word in a spoken dialogue. A named entity can be new brand or a word or words that a model has not been trained to recognize. Automatic speech recognition models that are trained on the human dialogues can be confused by the use of a named entity such as "sir kensington's" ketchup. Named entities can be human names, brand names, street names, single words, or multiple-word phrases that are uncommon or that might be more difficult than common words such as "tree" or "car" to be accurately recognized by a spoken dialog system. Named entities can be product attributes such as color or size. Because retraining an automatic speech recognition model can take weeks or months, it is desirable for there to be an approach to dealing with named entities in a spoken dialogue between a user and a spoken dialogue system. The approach disclosed herein introduces a new algorithm which corrects for named entity errors in a particular way to replace the text that is in error with the proper named entity. Another characterization of a named entity could also be a token which would refer to data (text or other data) associated with a candidate data such as, for example, a word or words that could be corrected through the process disclosed herein.

The approach disclosed herein introduces a new model as part of the speech processing component in which a text generated from an automatic speech recognition model is converted to a phonetic representation of the text. The phonetic representation is then matched with a database of named entities and associated phonetic representations of the named entities. A phonetic match between the phonetic representation of the text from the speech recognizer and an item in a mapping database can cause the model to replace the output text with the correct named entity and thus correct for the error in automatic speech recognition.

It is noted at the outset that the examples provided herein will be in the context of brand names but can also apply to any words that have a higher error rate in automatic speech recognition or any other words as well. The approach can be applied to any word or type of word that can be mis-recognized by a speech recognizer and is not limited to brand names, human names, street names, etc. Accordingly, the scope of application of this new corrective model is broader than using phonetic representations of words to correct for errors in brand names in speech recognition.

FIG. 1 illustrates the basic framework 100 associated with this disclosure. A device 104 operates in a location such as the user's home. The device 104 can be a mobile device, desktop device, server, smart speaker, or any other device that may be capable of voice interaction with users 102. The device 104 can of course be any device and is not limited to a device configured in the home. Generally speaking, the device 104 enables users 102 to articulate commands in natural language and accomplish tasks such as requesting music, making a to-do list, requesting weather reports, making purchases, and the like. Other tasks can include controlling devices within the home such as turning lights on or controlling appliances and heating or air conditioning systems. In one example, the device 104 communicates through a network 106 such as the Internet with a centralized artificial intelligence or machine learning speech processing component, node or network layer 108 that can include an automatic speech recognition (ASR) component 110 and/or a natural language understanding (NLU) component 112. In another aspect not shown in FIG. 1, such components might be configured locally on the device 104. The location of such speech processing components and whether they reside on locally on device 104 or are network-based is not material to this disclosure. In one aspect as shown in FIG. 1, the speech processing component 108 processes the speech and makes an intent determination. In another aspect, the processes can be shared across the device 104 and the speech processing component 108, or might be local to the device 104.

The device 104 will interact with the user 102 in a voice dialogue and the speech processing component 108 can convert audio signals into text via an ASR component 110 model and make a determination regarding the intent of the user 102 via the NLU component 112 model. If the intent is determined to be a shopping intent, for example, the speech processing component 108 will route the dialogue or the utterance to a particular domain 116, 118, 120, 122 associated with that intent. For purposes of this disclosure, the number of domains is not material. Each domain includes a speechlet which represents the components in the respective domain for managing the dialogue with the user through the device 104 to provide information or to achieve the tasks associated with the respective domain. Each domain performs certain functions associated with that domain and can further continue the dialogue with downstream services 124 as well. In view of this overall example framework, it is important that the ASR component 110 model achieves a high accuracy rate in converting speech audio signals from the user 102 into text.

This disclosure introduces a new model for handling brand names in speech recognition. The new model can be configured in a number of different locations in the framework 100 shown in FIG. 1. FIG. 1 shows the new named entity model 117 with an associated mapping database 119 as part of a respective domain 118. Here, the named entity model 117 coordinates with a mapping database 119. The named entity model 117 evaluates the utterance 114 and/or data such as metadata or interpretations 115 received from the speech processing component 108.

The model is titled a "named entity model" but as noted above, the basic process of the model in terms of seeking to correct for errors in automatic speech recognition can apply to any words that the ASR component 110 model has difficulty interpreting. Thus, the application of this model 117 can be beyond brand names, or human names that are difficult to recognize. Clearly, it is important that the ASR component 110 model accurately recognized and converted the audible signals into the appropriate text in order for an accurate result from the NLU component 112 model, as well as for additional dialogue processing at the respective domains 116, 118, 120, 122 and downstream services 124.

The speech processing component 108 can produce different data 114 in its analysis. For example, a routing decision to a particular domain might include several components such as a determination of the proper domain for the utterance (such as shopping 118, home control 122, communication 120), and so forth. The home control domain 122 can relate to the ability of the user to control components within a home such as appliances, lights, security systems, and media systems through voice commands. The information provided from the speech processing component 108 can also include data or interpretations 114/115 such as the utterance itself. The data or interpretations 114/115 can include interpretations of the speech processing results such as an intent associated with the specific domain such as in a shopping scenario, a desire to search, a desire to buy an item or to check a previous order. The data 114/115 can include slots with additional information such as a specific identification of an item, an order number, a price range, a person to be called, a device within the home to be controlled, and so forth. The data 114/115 can also include a confidence level such as a numerical ASR score that the speech processing component 108 can use to develop a hierarchy in which a list of hypothetical predictions or solutions will be generated. The data 114/115 can also include binary data such as a contextual signal, data about a previous interaction, and so forth. The data 114/115 can include categorical information such as a device type related to device 104. The routing decision can be based on the intent having the highest confidence value from the list. Where brand names might be introduced by the user 102 into dialogue, it remains important to get the resulting text from an ASR component 110 as correct as possible for all of the continued processing associated with the dialogue.

Errors in speech recognition can promulgate through downstream operations inasmuch as the utterance 114 and associated data include the error. Problems in the routing of a dialogue to a wrong domain can occur. For example, if the user desires to buy a product and uses a specific brand name for the product, the user should be routed to a shopping domain 118. However, because of an error in automatic speech recognition 110 the user might be sent to the home control domain 120, which can cause confusion. In another aspect, if a brand name for a refrigerator is used as part of a desire to control that appliance through the home control domain 122, an error in recognizing that brand name can cause the routing to the wrong domain.

This disclosure provides for the introduction of the new named entity model 117 which is designed to correct for errors in automatic speech recognition 110. The named entity model 117 is shown to be embedded in the speech processing component 108, could be configured as a downstream process from the speech processing component 108 or could be embedded in particular domains as well as is shown in connection with the shopping domain 118.

As noted above, brand names are especially difficult for an automatic speech recognition model 110 to recognize as they can be anything and typically brand names are differ from normal words used as part of a conversation. For example, a person 102 may be speaking with a device 104 and ask for delivery of "Heinz ketchup." The word "Heinz" is a brand name that is difficult for the ASR model to recognize. But words like ketchup, mustard or mayonnaise are often associated with the brand name, such as "Heinz". Most tokens can be associated with a brand but these tokens in particular are more often associated with brands like "Heinz" (or a similar brand selling condiments and sauces).

The words discussed above are typically standard descriptive words of a product. In this scenario, this disclosure characterizes such words as "anchor words" inasmuch as they are recognizable with a higher degree of accuracy by the ASR component 110 model and they have a close association to the brand name. The model can identify anchor words that might be near the word that appears to have been mis-recognized, is difficult to recognize or has a lower confidence level with respect to the ASR result.

Finding anchor words can be an automated process or a manual process. For example, in connection with the named entity model 117, the system can identify specific anchor words which can be identified and the output of the ASR component 110 model. When an anchor word is identified, the system can then analyze words before and/or after the anchor word and apply the principles of the algorithm to see if a brand name can replace some text.

In another aspect, finding the anchor words can be a manual process in which, for example, a dialogue act can be initiated to ask the user for a confirmation that they desire to buy ketchup or to purchase a dishwasher. In this scenario, the user does not have to say "Heinz" for ketchup or "Samsung" for a Samsung dishwasher but can confirm that they do want to buy ketchup or a dishwasher which will confirm that that is an anchor word in the algorithm that can be implemented to identify the proper brand name.

Once an anchor word is identified within the text output by the ASR component 110 model, the system can then evaluate words or text around the anchor word using phonetic representations of those words. For example, assume the user says "buy sir kensingon's ketchup" to the device 104. The output of the ASR component 110 model is "buy serkin's ingtons ketchup". The system can identify that the word "ketchup" is an anchor word. This identifies a context of the utterance as being connected with a product and that there is a chance or likelihood that there is a brand name in the vicinity of the anchor word.

The named entity model 117 utilizes a phonetic representation of the text as part of its process. The ASR component 110 model will include an acoustic model and a language model. The acoustic model will evaluate the audible signal received and generate a phonetic representation of the audible signal. The language model will seek to convert that phonetic representation into text. The named entity model 117 will either generate or receive from the speech processing component 108 a phonetic representation of the potential brand name. In this case, the named entity model 117 can receive the phonetic code "SARKANSANKTANS" as a phonetic representation of "serkin's ingtons", or the text that is in error. The named entity model 117 can then utilize a brand database 128/119/132 that stores brand names and their associated phonetic representations. The database 128/119/132 would include an entry corresponding to the string "sir kensington's" which is the correct brand name for this ketchup. Also in the database would be associated phonetic representation of the brand name as "SARKANSANK-TAN". The named entity model 117 will seek to identify a match between the phonetic representation of the text in error that is output from the ASR component 110 model and a phonetic representation in the brand database 128/119/132 which will have a correct word or text associated with the brand name.

A similarity algorithm can be used to match the first phonetic representation with the second phonetic representation according to a certain threshold to identify that there is a match in the brand database 128/119/132. Any number of similarity algorithms could be used for this purpose. Assuming that there is a match found, the text ultimately output from the ASR component 110 model or the speech processing component 108 can be corrected or recovered to be "buy sir kensington's ketchup."

When the named entity model 117 is configured within the speech processing component 108, the corrected text plus the identification of a brand can then be passed to other components such as the NLU component 112 and could be included in output data such as an utterance 114 or other metadata. Thus, this additional information can be used to route the utterance 114 to the proper domain such as a shopping domain 118 or other domain. Where the named entity model 117 is configured within a domain 118, the corrected text and any other data can be used for further dialog within the domain 118, downstream services within the domain 118 or outside of the domain 124. The named entity model 130 is shown as part of the downstream service 124 with its associated mapping database 132.

This disclosure also notes that in one aspect, to ensure the accuracy of the phonetic representations, the same phonetic model that is used to generate the phonetic representation of the user speech that is provided to the speech processing component 108 should be used to generate the phonetic representations of the brand names that is stored in the mapping database 119. Utilizing different models to generate phonetic representations can cause errors in the matching process. The system may identify the phonetic model from the ASR component 110 and choose from the mapping database 119 a phonetic representation that was generated using the same model or a model with similar characteristics from the model used.

In one aspect, this disclosure includes unique heuristics that match the phonetic representation of an utterance to a phonetic representation brand mapping database. For the heuristics, the system can utilize techniques such as taking into account tokens that surround the tokens that are considered brand token candidates. The system can also apply thresholds for certain phonetic code signatures.

In one aspect described above, the context of the utterance is determined based on the identification of an anchor word or anchor words within the utterance and which can lead to a likelihood that a brand name is found within the utterance and likely recognized inaccurately. The context of the utterance may also include other words or indicators that there could be a brand name in the utterance. For example, the utterance described above includes the word "buy". This is not necessarily an anchor word in that it is not a description of a product but it is an indication that the user desires to purchase an item. Accordingly, words such as "buy" or "purchase" or "please deliver" can provide additional context which can increase the likelihood of the existence of a brand name within the utterance. The context can therefore represent one or more characteristics of the utterance which can increase the likelihood of a brand name being included within the utterance. The model can identify or utilize one or more of such characteristics of the utterance. For example, the named entity model 117 might base its determination to do the phonetic matching approach based on the word "buy". The algorithm 117 might be implemented based on the anchor word "ketchup", or it might make a determination to implement the phonetic representation matching process based on a combination of the two indicators. The system may also include a broader context such as previous utterances, a time of day, a time of the year, current circumstances, or other external factors which can increase the likelihood of the utterance including a brand name. For example, the system may be aware of a birthday of a person in the home in the following week. This information could be used to enhance the models determination that it is likely that a brand name is included in an utterance given the timing of the request in view of other life events.

In one aspect, the processing or generation of phonetic representations can parse through the utterance in the following manner. The system may determine a phonetic representation of each separate word such as a first representation for "please", a second representation for "buy", and so forth. Each n-gram in the utterance can have a separate phonetic representation. Then, the system could generate a separate phonetic representation for "please buy" and "buy serkin's" and "serkin's ingtons" and "ingtons ketchup." Other variations such as three words together can be represented phonetically as well. In this manner, the system can vary the combinations of text in order to capture the various possible combinations in order to have a set of phonetic representations which can be used to match against the mapping database 119. This approach can be taken through the entire utterance or could be focused on or weighted towards portions of the text that are adjacent to an anchor word, or between a purchase indication word (e.g., "buy') and an anchor word (e.g., "ketchup"). Thus, the algorithm that generates phonetic representations from the entire utterance can weigh those phonetic representations based on their association or distance from anchor words or other important words in the utterance.

Thus, the system will generate a number of phonetic encodings from the utterance from the various n-grams and then determine whether any of these encodings match a phonetic encoding in the mapping database 119. Again, it is preferable that the system uses the same phonetic encoding algorithm to obtain the set of phonetic encodings from the utterance that was used to generate the phonetic encodings of brand names in the mapping database 119. In this regard, the system could identify the algorithms used by the ASR component 110 model to determine phonetic representations of the user utterance and evaluate whether that same algorithm was used to generate phonetic encodings of brands in the mapping database 119. The system could take remedial steps if necessary of either choosing a different database which was generated by a matching phonetic encoding algorithm or if necessary generate new phonetic representations using the proper phonetic encoding algorithm and in order to match phonetic representations that were generated by the same phonetic encoding algorithm.

The system will take a first phonetic encoding from the utterance and perform a string similarity process to compare the first phonetic encoding with a set of phonetic encodings in the mapping database 119 to identify a second phonetic encoding as a match. For example, the system could use a Levenshtein distance for measuring the difference between two sequences. Other comparison approaches can be applied as well. As a result of the comparison, the system provides a score or a result of the comparison. The system could determine whether the score meets a threshold value which would then result in a high enough level of confidence that a match was found in the mapping database 119 with respect to a comparison of the phonetic representations. In this manner, the named entity model 117 can isolate the portion of the phrase spoken by the user that is likely a named entity (such as a brand name) and that has an entry in the mapping database 119.

Assuming that based on the comparison a match is found in the brand database, the system can then replace the portion of the utterance that was represented by the first phonetic encoding with the text representing the brand from the brand database with. In the example above, the text "serkin's ingtons" which has the first phonetic representation as "SARKANSANKTANS" matches according to a threshold and the string comparison algorithm the phonetic encoding "SARKANSANKTANS" in the mapping database 119 for the words "sir kensington's". Thus the recovery of the proper brand name can be made. In one aspect, the text "serkin's ingtons" can represent different tokens generated by the ASR component 108 and the process disclosed herein identifies or isolates the candidate tokens for replacement and correction. The replacement tokens from the mapping database 119 would be "sir kensington's". The tokens are disclosed as text but they can also be any other form of data representing the results of the ASR component 108. For example, the token(s) could be the phonetic representation "SARKANSANKTANS".

Figure 2A:
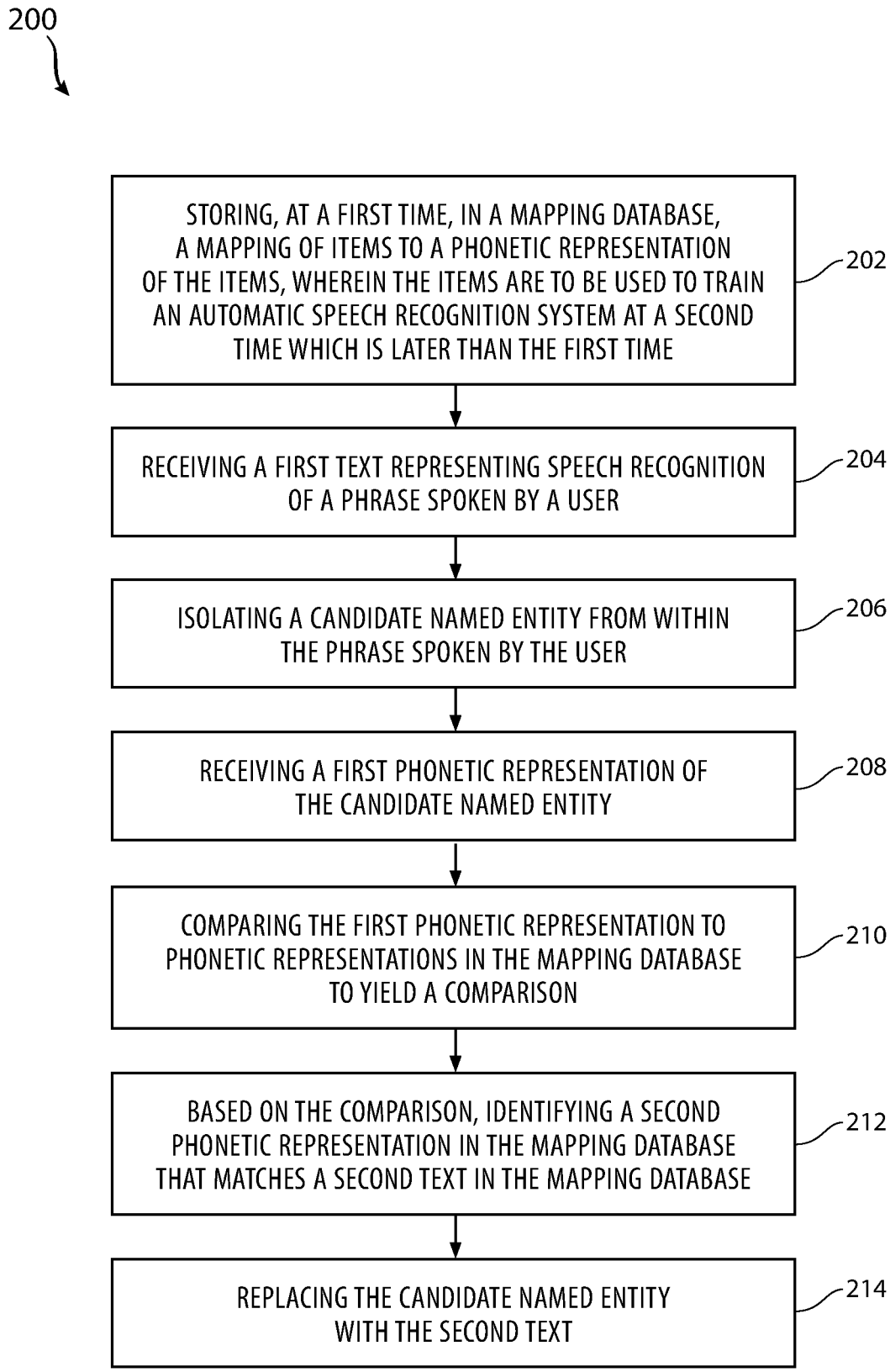
FIG. 2A illustrates a method example.

FIG. 2A illustrates an example method 200 which is focused on the timing of performing the recovery process using phonetic representations. Typically, the algorithm would run on a named entity before the ASR component 110 model was trained on the use of the named entity. An example method 200 includes storing, at a first time, in a mapping database, a mapping of items to a phonetic representation of the items, wherein the items are to be used to train an automatic speech recognition system at a second time which is later than the first time (202) and, prior to the second time, operating a named entity model 117 to perform a set of operations. The model can be implemented as part of a specific domain 118 or other node or component within an overall spoken dialog system. These operations include receiving a first text representing speech recognition of a phrase spoken by a user (204), isolating a candidate named entity from within the phrase spoken by the user (206), receiving a first phonetic representation of the candidate named entity (208). The first phonetic representation of the candidate named entity can be received from one of the speech recognition model (which can include an acoustic model) or a separate acoustic model chosen to match a mapping database acoustic model used to generate data for the mapping database 119. The phonetic representation of the candidate named entity can be determined or used in connection with the mapping database to identify replacement data for the first text or the candidate named entity.

In one aspect, the step of isolating or identifying a candidate named entity from within the phrase is performed in connection with a phonetic matching process in which tokens representing the result of an ASR model are combined in various n-grams and compared to stored phonetic representations of named entities to determine whether a candidate named entity is within the ASR output. There can be a variety of ways of matching phonetic representations of ASR output and one preferred example is provided. Generally, the step of isolating or identifying the candidate named entity can occur via a phonetic matching process in which one or more phonetic representations in a spoken utterance are matched to phonetic representations in a database. This matching process can result in isolating from the spoken utterance which phonetic representations or tokens are a candidate for replacement.

As noted above, the method can further include comparing the first phonetic representation to phonetic representations in the mapping database to yield a comparison (210), based on the comparison, identifying a second phonetic representation in the mapping database that matches a second text in the mapping database (212) and replacing the first text or the candidate named entity with the second text (214). The method can further include training, at the second time, an automatic speech recognition system using the items in the mapping database. In this manner, the automatic speech recognition system will be trained on the named entities in time (weeks to months), but the named entity model can be implemented in hours and improve the performance of the respective domain 118 that implements the named entity model. In another aspect, the method can include ceasing to perform the operations after the training of the automatic speech recognition system using the items in the mapping database 119. In another aspect, a retrained ASR system on the specific named entities and the named entity model disclosed herein can operate in parallel for a time to confirm the accuracy of the retrained ASR system or until a threshold is met.

The named entities can be words for which an ASR error rate is high according to a threshold and do not specifically have to be brands. In one aspect, the comparing of the first phonetic representation to phonetic representations in the mapping database 119 occurs via application of a phonetic similarity algorithm and a context. The context can be one or more of a determination that the phrase spoken by the user relates to a purchasing intent and an anchor word associated with another word. The context can also include outside information such as a date, events associated with the speaker or friends or family members associated with the speaker, weather events and so forth.

Figure 2B:
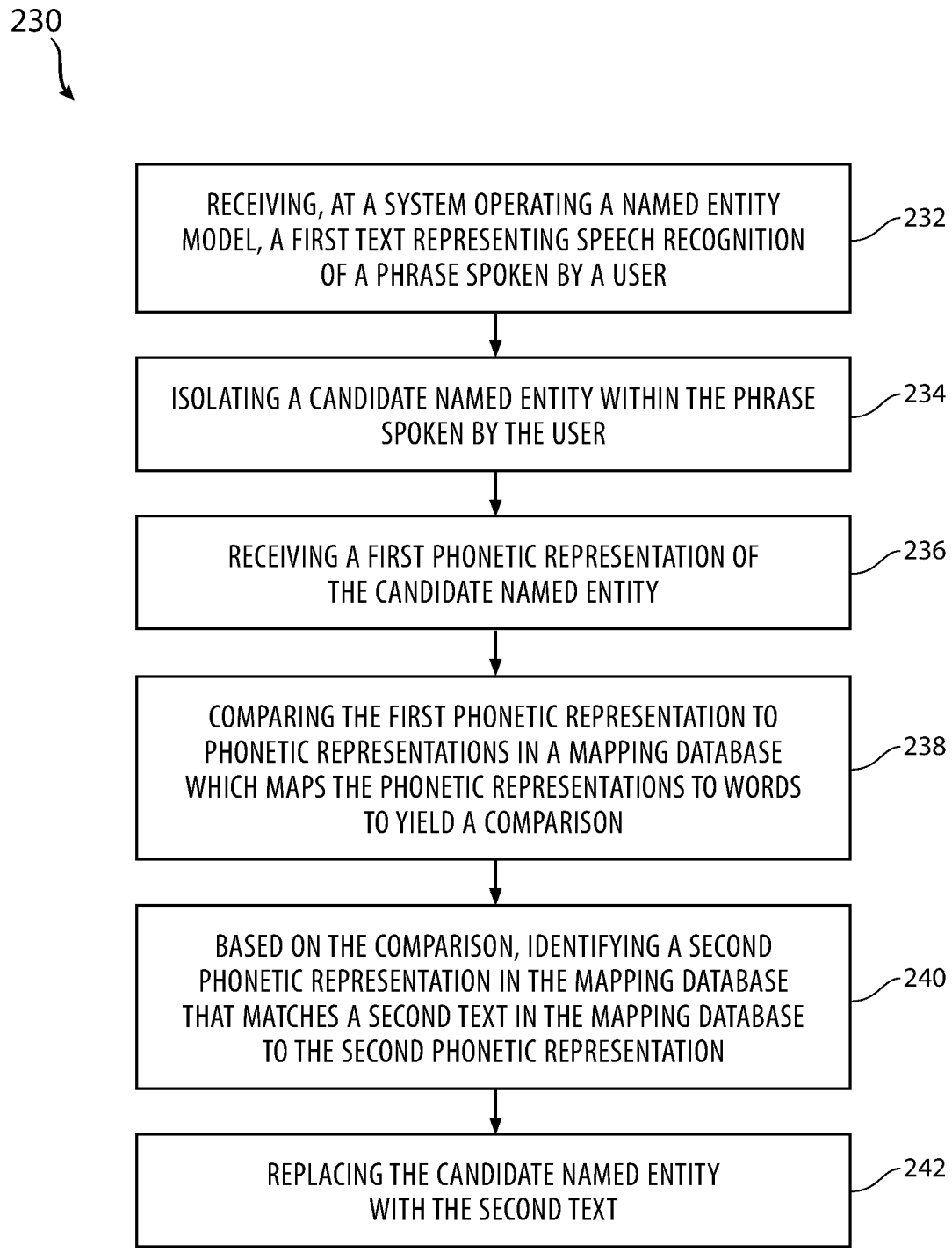
FIG. 2B illustrates another method example.

FIG. 2B illustrates another example method 230 according to this disclosure. An example method 230 includes one or more of receiving, at a system operating a named entity model, a first text representing speech recognition of a phrase spoken by a user (232), isolating a candidate named entity within the phrase spoken by the user (234), receiving a first phonetic representation of the candidate named entity (236), comparing the first phonetic representation to phonetic representations in a mapping database which maps the phonetic representations to words to yield a comparison (238), based on the comparison, identifying a second phonetic representation in the mapping database that matches a second text in the mapping database to the second phonetic representation (240) and replacing the first text with the second text (242). In one aspect, the system does not "receive" the first phonetic representation of the candidate named entity but determines or uses the first phonetic representation of the candidate named entity, after it is isolated or identified, in the comparison process to obtain the second text.

The words in the mapping database can relate to named entities or brands for which an automatic speech recognition error rate is high according to a threshold or to other words that are potentially problematic for a high accuracy rate in speech recognition, such as words in a different language or words hard to pronounce with a particular accent. Words such as family names, person names, street names, business names, product characteristics and so forth can be difficult to convert from speech to text. The method can be performed prior to training the ASR system on the words in the mapping database. In one aspect, the method includes ceasing to perform automatic speech recognition as shown in FIG. 2B after the training of the automatic speech recognition system using the words in the mapping database.

The comparing of the first phonetic representation to phonetic representations in the mapping database occurs via application of a phonetic similarity algorithm and a context. The context can include one or more of a determination that the phrase spoken by the user relates to a purchasing intent, an anchor word associated with another word or a candidate named entity, broader utterances in a dialogue with a user, historical data associated with previous dialogues with the user, external data to the spoken dialogue, personal data obtained from social media applications, and so forth.

The method can of course also be operable from the standpoint of a particular domain 118 that receives text from a speech recognition component 108 representing an utterance from a user, and receives a first phonetic representation of the phrase spoken by the user. The domain 118 can receive the utterance and determine or isolate from the utterance, interpretation or text of the utterance, what the candidate named entity might be. The model can then utilize the candidate named entity to select replacement data (text or other data) from the mapping database 119. A named entity model 117 operating at the domain 118 can compare the first phonetic representation to phonetic representations in a mapping database 119 which maps the phonetic representations to words to yield a comparison and, based on the comparison, identifies a second phonetic representation in the mapping database that matches a second text in the mapping database to the second phonetic representation. The named entity model 117 can then replace the first text or candidate named entity with the second text.

The named entity model 117 is generally described above as being part of one of the domains 116, 118, 120 122. The model 117 and mapping database 119, however, can be implemented in other components of the framework 100, such as at the speech processing component 108 or in a downstream server 124. In each respective location, the general process described herein can be similar in that the output is processed according to the principled here to provide replace text for ASR errors.

Figure 3:
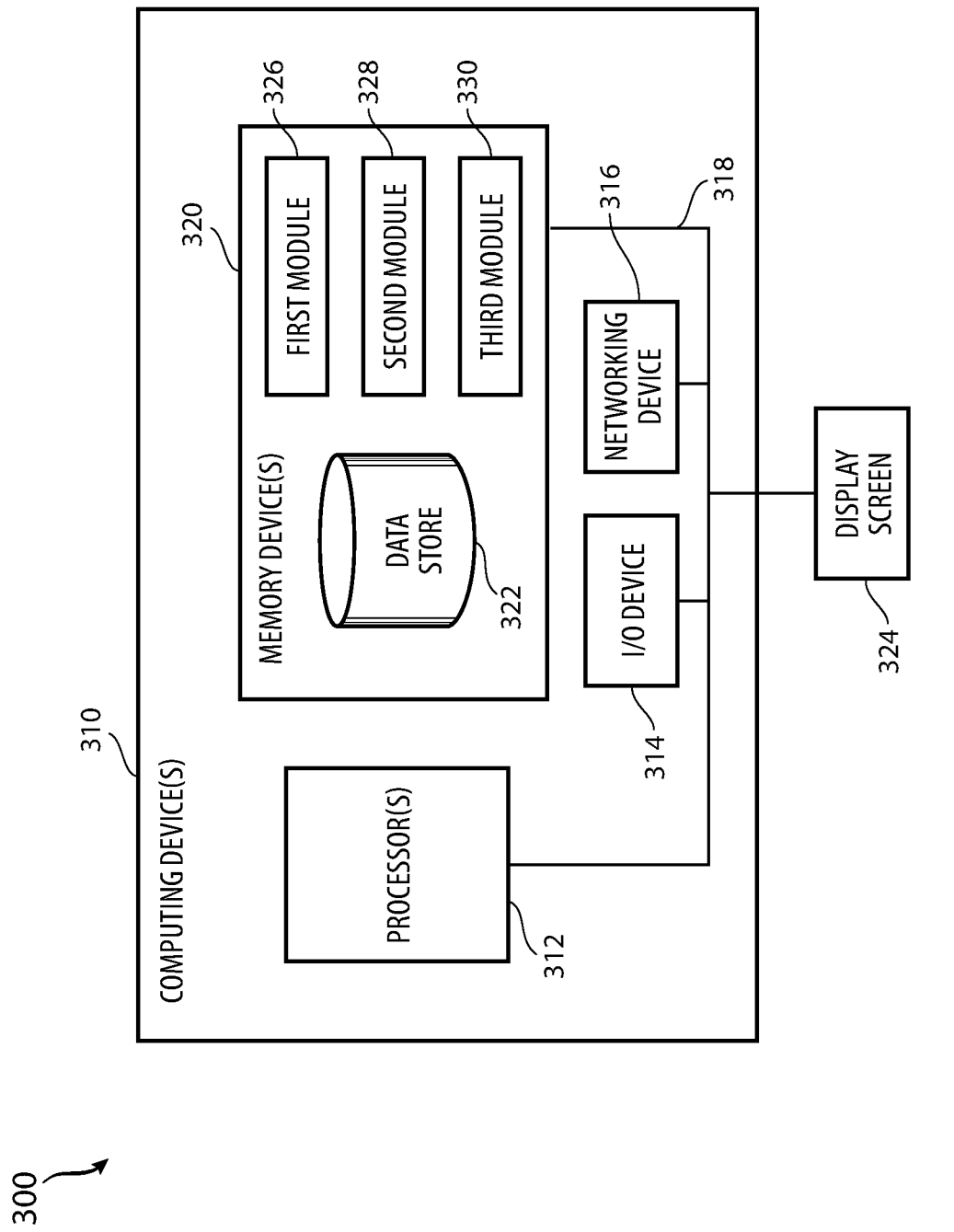
FIG. 3 illustrates an example system embodiment.

FIG. 3 illustrates a computing device 310 on which modules of this technology may execute. For example, one or more of the components shown in FIG. 3 can be used to represent hardware features of device 104, or the speech processing component 108 and/or features used for a respective domain 116, 118, 120, 122 or downstream service 124. A computing device 310 is illustrated on which a high level example of the technology may be executed. The computing device 310 may include one or more processors 312 that are in communication with memory devices 320. The computing device 310 may include a local communication interface 318 for the components in the computing device. For example, the local communication interface 318 can be a local data bus and/or any related address or control busses as may be desired.

The memory device 320 may contain modules that are executable by the processor(s) and data for the modules. Located in the memory device 320 are modules executable by the processor. For example, a first module 326, a second module 328, and a third module 330, as well as other modules, may be located in the memory device 320. These modules can perform operations such as speech recognition or natural language understanding, or could perform a routing decision. The named entity model 117 can be represented by one of these modules 326, 268, 330 in that the named entity model 117 implemented by a hardware component can result in a special purpose computer system programmed to evaluate the output of an ASR component 110 and perform a replacement of text according to the principles disclosed herein. A data store 322 may also be located in the memory device 320 for storing data related to the modules and other applications along with an operating system that is executable by the processor(s) 312. Each module represents a combination of software programming and a hardware component to carry out program steps and does not encompass a signal per se.

The computing system 310 of FIG. 3 may be utilized for providing the trained models as disclosed herein. For example, the first module 326 can be used to make predictions on user intent. The second module 328 may select a network-based domain for dialogue routing. The third module 330 may evaluate the ASR component 110 output and replace text from the brand database 128/119/132 as described herein.

The computing device 310 may further include or be in communication with a device 324, which may include a display device or other computing device. The device 324 may be available for an administrator to use in interfacing with the computing device 310, such as to review operation of the system, make improvements to the system and so forth.

Various applications may be stored in the memory device 320 and may be executable by the processor(s) 312. Components or modules discussed in this description that may be implemented in the form of software using high programming level languages that are compiled, interpreted or executed using a hybrid of the methods. Any component can be a virtual component as well.

The computing device 310 may also have access to I/O (input/output) devices 314 that are usable by the computing devices. An example of an I/O device 314 is a display screen 324 that is available to display output from the computing devices. The I/O device 314 might represent a speech interface enabling a user to speak to a microphone and hear responsive system utterances through a speaker. Other known I/O devices may be used with the computing device as desired. Networking device 316 and similar communication devices may be included in the computing device 310. The networking device 316 may be a wired or wireless networking device 316 that connects to the internet, a local area network (LAN), wide area network (WAN), or other computing network.

The components or modules that are shown as being stored in the memory device 320 may be executed by the processor 312. The term "executable" may mean a program file that is in a form that may be executed by a processor 312. For example, a program in a higher level language may be compiled into machine code in a format that may be loaded into a random access portion of the memory device 320 and executed by the processor 312, or source code may be loaded by another executable program and interpreted to generate instructions in a random access portion of the memory to be executed by a processor 312. The executable program may be stored in any portion or component of the memory device 320. For example, the memory device 320 may be random access memory (RAM), read only memory (ROM), flash memory, a solid state drive, memory card, a hard drive, optical disk, floppy disk, magnetic tape, or any other memory components.

The processor 312 may represent multiple processors and the memory 320 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped.

Some of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, include one or more blocks of computer instructions, which may be organized as an object, procedure, or function. Nevertheless, the executable code of an identified module need not be physically located together, but may include disparate instructions stored in different locations which include the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium or device that includes volatile and non-volatile, removable and non-removable media implemented with any technology for the storage of information such as computer readable instructions, data structures, program modules, or other data. Computer readable storage media include, but is not limited to, RAM, ROM, electrically erasable programmable ROM (EEPROM), flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application. A computer-readable media or device does not constitute a signal per se independent of any hardware component.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Embodiments of this disclosure can be claimed from the standpoint of any component disclosed herein. Embodiments could encompass a combination of operations performs in two or more particular layers in any order. In one example, claims could be directed to a product by process in which the output of a false accept detection model can be the subject of a claim or the trained deep neural network model could be the subject of a claim. Claims can be developed from the standpoint of the downstream service 124 and the data received and actions taken in that environment based on a received signal indicating the detection result of the model 120/122.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   training, before a first time, an automatic speech recognition system with first items;
   storing, at the first time and in a mapping database, a mapping of second items to phonetic representations of the second items, wherein the second items are not included in the first items;
   prior to a second time that is later than the first time:
      receiving a first text representing a phrase spoken by a user, wherein the first text representing the phrase is generated by the automatic speech recognition system;
      identifying, from the first text representing the phrase spoken by the user, an anchor word that is recognizable by the speech recognition system;
      isolating, from the first text representing the phrase spoken by the user, a candidate named entity, wherein the candidate named entity is isolated based at least in part on a proximity in the first text of the anchor word to the candidate named entity, wherein isolating the candidate entity based at least in part on a proximity in the first text of the anchor word to the candidate named entity comprises:
         combining different phonetic representations of different respective portions of the first text in different phonetic combinations, wherein each different phonetic combination is assigned a weight based at least in part on the proximity of the different respective portion to the anchor word; and
         comparing, based at least in part on the weights, the different phonetic combinations to the phonetic representations in the mapping database to determine the first phonetic representation of the candidate named entity;
      receiving a first phonetic representation of the candidate named entity;
      comparing the first phonetic representation to the phonetic representations of the second items in the mapping database to yield a comparison;
      based at least in part on the comparison, identifying a second phonetic representation in the mapping database that matches a second text in the mapping database;
      replacing the candidate named entity with the second text; and
   training, at the second time, the automatic speech recognition system using the second items.

2. The computer-implemented method of claim 1, further comprising:
   ceasing to perform the operations of the named entity model after the second time.

3. The computer-implemented method of claim 1, wherein the candidate named entity comprises at least one of a brand name of a product, a person's name, a product description or a street name.

4. The computer-implemented method of claim 1, wherein the second items comprise words for which an automatic speech recognition error rate is high according to a threshold.

5. The computer-implemented method of claim 1, wherein comparing the first phonetic representation to the phonetic representations in the mapping database comprises applying at least one of a phonetic similarity algorithm or a context to the comparison.

6. The computer-implemented method of claim 5, wherein the context comprises a determination that the phrase spoken by the user relates to at least one of: (i) a purchasing intent associated with a word of the first text, or (ii) the anchor word.

7. A system comprising:
   a processor; and
   a computer-readable storage device storing instructions which, when executed by the processor, cause the processor to perform operations comprising:
      training, before a first time, a speech recognition system using with first items;
      prior to a second time that is later than the first time, receiving a first text representing words uttered by a user, wherein the first text representing the words is generated by the speech recognition system;
      identifying, from the first text representing the words uttered by the user, an anchor word that is recognizable by the speech recognition system;
      isolating, from the first text representing the words uttered by the user, a candidate named entity, wherein the candidate named entity is isolated based at least in part on a proximity in the first text of the anchor word to the candidate named entity, wherein to isolate the candidate named entity based at least in part on a proximity in the first text of the anchor word to the candidate named entity, the instructions, when executed by the processor, further cause the processor to perform operations comprising:

combining different phonetic representations of different respective portions of the words uttered by the user in different phonetic combinations, wherein each different phonetic combination is assigned a weight based at least in part on the proximity of the different respective portion of the words to the anchor word; and comparing based at least in part on the weights, the different phonetic combinations to the phonetic representations in the mapping database to identify the first phonetic representation of the candidate named entity;

identifying a first phonetic representation of the candidate named entity;

comparing the first phonetic representation to phonetic representations in a mapping database to yield a comparison, wherein the mapping database maps the phonetic representations to stored words;

based at least in part on the comparison, identifying a second phonetic representation in the mapping database that matches a second text in the mapping database to the second phonetic representation; and replacing the candidate named entity with the second text.

8. The system of claim 7, wherein the stored words comprise brand names for which a speech recognition error rate is high according to a threshold.

9. The system of claim 7, wherein the stored words comprise at least one brand name of a product to be sold.

10. The system of claim 7, wherein to compare the first phonetic representation to phonetic representations in the mapping database, the computer-readable storage device stores further instructions which, when executed by the processor, cause the processor to perform operations comprising applying at least one of a phonetic similarity algorithm or a context to the comparison.

11. The system of claim 10, wherein the context comprises a determination that the words uttered by the user relate to at least one of: (i) a purchasing intent associated with a word of the first text, or (ii) the anchor word.

12. The system of claim 7, wherein the instructions, which when executed by the processor, cause the processor to perform operations further comprising training, at the second time, the speech recognition system with the candidate named entity.

13. A computer-implemented method comprising:

training, before a first time, a speech recognition model with first items;

prior to a second time that is later than the first time, receiving a first text representing a phrase spoken by a user, wherein the first text is received from the speech recognition model;

identifying, from the first text representing the phrase, an anchor word that is recognizable by the speech recognition model;

isolating, from the first text, a candidate named entity, wherein the candidate named entity is isolated based at least in part on a proximity in the first text of the anchor word to the candidate named entity, wherein isolating the candidate named entity based at least in part on proximity in the first text of the anchor word to the candidate named entity comprises:

combining different phonetic representations of different respective portions of the first text in different phonetic combinations, wherein each different phonetic combination is assigned a weight based at least in part on the proximity of the different respective portion to the anchor word; and comparing, based at least in part on the weights, the different phonetic combinations to the phonetic representations in the mapping database to determine the first phonetic representation of the candidate named entity;

comparing a first phonetic representation of the candidate named entity to phonetic representations in a mapping database to yield a comparison, wherein the mapping database maps the phonetic representations to words;

based at least in part on the comparison, identifying a second phonetic representation in the mapping database that correlates a second text in the mapping database to the second phonetic representation; and replacing the candidate named entity with the second text.

14. The computer-implemented method of claim 13, wherein the words in the mapping database comprise brand names for which a speech recognition error rate is high according to a threshold.

15. The computer-implemented method of claim 13, wherein the first phonetic representation of the candidate entity is received from at least one of: (i) the speech recognition model, or (ii) a separate acoustic model chosen to correlate to a mapping database acoustic model used to generate data for the mapping database.

16. The computer-implemented method of claim 13, wherein comparing the first phonetic representation to phonetic representations in the mapping database comprises applying at least one of a phonetic similarity algorithm or a context to the comparison.

17. The computer-implemented method of claim 16, wherein the context comprises a determination that the phrase spoken by the user relates to at least one of: (i) a purchasing intent associated with a word of the first text, or (ii) the anchor word.

* * * * *